United States Patent
Elad et al.

(10) Patent No.: US 10,805,376 B2
(45) Date of Patent: Oct. 13, 2020

(54) COMMUNICATION SERVER AND METHOD FOR SELECTIVE USE OF REAL-TIME COMMUNICATION FEATURES

(71) Applicant: Genband US LLC, Plano, TX (US)

(72) Inventors: Asi Elad, Kiryat Onno (IL); Jean-Francois Morin, Audet (CA)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 550 days.

(21) Appl. No.: 15/389,698

(22) Filed: Dec. 23, 2016

(65) Prior Publication Data

US 2017/0195392 A1    Jul. 6, 2017

Related U.S. Application Data

(60) Provisional application No. 62/273,908, filed on Dec. 31, 2015.

(51) Int. Cl.
*H04L 29/08* (2006.01)
*H04L 29/06* (2006.01)

(52) U.S. Cl.
CPC .......... *H04L 67/02* (2013.01); *H04L 65/1063* (2013.01); *H04L 65/1069* (2013.01); *H04L 65/1073* (2013.01); *H04L 65/4015* (2013.01); *H04L 67/141* (2013.01)

(58) Field of Classification Search
CPC ... H04L 67/02; H04L 67/141; H04L 65/4015; H04L 65/1069; H04L 65/1073; H04L 65/1063
See application file for complete search history.

(56) References Cited

U.S. PATENT DOCUMENTS

| | | | |
|---|---|---|---|
| 9,965,743 B2 * | 5/2018 | Sun | G06Q 10/10 |
| 2014/0128108 A1 * | 5/2014 | Siegel | H04L 65/1016 455/458 |

* cited by examiner

*Primary Examiner* — Kim T Nguyen
(74) *Attorney, Agent, or Firm* — Haynes and Boone, LLP (57) ABSTRACT

An apparatus and method for receiving, at a communication server, a web-based request for a real-time communication session, selecting, at the communication server, a number of applications based on information included in the web-based request to support the real-time communication session, the number of applications being from among the plurality of applications running on the one or more application servers, communicating with the one or more application servers to enable provision of the number of applications for the real-time communication session, and enabling the real-time communication session between a first device and a second device.

20 Claims, 4 Drawing Sheets

COMMUNICATION SERVER AND METHOD FOR SELECTIVE USE OF REAL-TIME COMMUNICATION FEATURES

CROSS REFERENCE TO RELATED APPLICATION

The present description claims priority to the commonly owned U.S. Provisional Patent Application No. 62/273,908, titled COMMUNICATION SERVER AND METHOD FOR SELECTIVE USE OF REAL-TIME COMMUNICATION FEATURES and filed Dec. 31, 2015, which is incorporated herein by reference in its entirety.

TECHNICAL FIELD

The present description relates, in general, to communication systems and, more specifically, to facilitating selection and use of real-time communication features through a communication server including an orchestration layer

BACKGROUND

WebRTC (Web Real Time Communication) is a project by the World Wide Web Consortium (3C) to define a set of Application Programming Interfaces (APIs) to enable browser-to-browser and browser-to-device applications for voice, video, and text. The introduction of WebRTC as a solution allows for the creation of new usage models for communication services. One new usage model includes the ability of a web user to simply initiate a real-time communication via a web-based application on the user's device (e.g., a personal computer, mobile device, etc.). In this model, the user can access an identifier (e.g., uniform resource identifier (URI)) pointing to a specific carrier communication ID (e.g., phone number, SIP user ID) through the web-based application to initiate the WebRTC communication session. However, currently there is no capability integrated within web-based applications to allow for the real-time WebRTC communication session to be conducted via the web-based applications itself.

In one example, a user utilizes a web-based application (e.g., browser or smartphone application) to visit a merchant's e-commerce content and contemplates making a purchase. To facilitate the purchase, a webpage of the merchant's e-commerce website includes a link that indicates that the user can initiate a communication session with a merchant's representative in real time to ask questions or to place an order. When the user selects the link through the web-based application, the merchant provides a WebRTC client to allow the user and the merchant's representative to conduct the communication session (e.g., voice, video, and text). The communication session may include the user and the merchant's representative collaborating over audio and/or video and/or file-sharing communication session.

The merchant is responsible and bears the cost for the above real-time communication sessions. Even though, in the above real-time communication session, the user is the calling party and the merchant's representative (i.e., the merchant) is the destination party, the cost for the communication session is paid for by the merchant. That is, the merchant pays for the above communication session between the user and the merchant representative as part of providing customer service to its clients.

Now, to allow the separate types (e.g., voice, video, text, file sharing) of real-time communication sessions, the merchant registers and maintains accounts with separate service providers that enable the separate types of real-time communication sessions. It would be much more convenient for the merchant to simply register and maintain one account through which the merchant enables provision of the separate types (e.g., voice, video, text, file sharing) real-time communication sessions. This would be advantageous for the merchants, and would allow the merchants to optimize their operations for various purposes including improved commerce.

In a separate scenario in which a software developer is developing a web-based application (e.g., web browser, smart phone application), it would be desirable for the developer to be able to design the web-based application to communicate with a unified interface that enables and manages provision of the separate types (e.g., voice, video, text, file sharing) real-time communication sessions. This would desirably avoid the need for the developer to design the web-based application to include separate interfaces and protocols for communicating with separate interfaces and protocols used by the service providers of the separate types (e.g., voice, video, text, file sharing) real-time communication sessions.

BRIEF DESCRIPTION OF THE DRAWINGS

The present disclosure is best understood from the following detailed description when read with the accompanying figures.

SUMMARY

According to one embodiment, a method in a communication server associated with a plurality of applications running on one or more application servers is disclosed. The method includes receiving, at a communication server, a web-based request for a real-time communication session, selecting, at the communication server, a number of applications based on information included in the web-based request to support the real-time communication session, the number of applications being from among the plurality of applications running on the one or more application servers, communicating with the one or more application servers to enable provision of the number of applications for the real-time communication session, and enabling the real-time communication session between a first device and a second device.

According to another embodiment, an apparatus including a communication server is disclosed. The communication server receives a request from a registered device of the communication server, the request being for a real-time communication session between a first device operating over a first network and a second device operating over a second network, enables enable transmission of a notification over the second network to the second device, the notification notifying the second device of the request for the communication session, receives an indication of acceptance of the communication session from the second device, selects a number of real-time communication (RTC) applications running on one or more application servers to support the real-time communication session, and enables the real-time communication session between the first device and the second device over a combination of the first network and the second network.

According to another embodiment, a computer readable storage medium is disclosed. The computer readable storage medium includes embedded therein instructions, which when executed by a processor, cause the processor to perform a method for enabling real-time communication sessions. The computer readable storage medium includes code to receive, at a communication server, a web-based request for a communication session between a first device operating over a first network and a second device operating over a second network, the web-based request being received from a client/server of the communication server, code to determine whether the client/server is registered with the communication server, code to enable, in response to determining that the client/server is registered with the communication server, transmission of a notification over the second network to the second device, the notification notifying the second device of the request for the communication session, code to receive, at the communication server, an indication of acceptance of the communication session from the second device, code to select a number of real-time communication (RTC) applications running on one or more application servers for supporting the real-time communication session, and code to enable the selected RTC applications to support the communication session between the first device and the second device over a combination of the first network and the second network.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As discussed above, it would be advantageous for the merchant to simply register and maintain one account through which the merchant enables provision of the separate types (e.g., voice, video, text, file sharing) real-time communication sessions. Further, it would be desirable for the developer to be able to design the web-based application to communicate with a unified interface that enables and manages provision of the separate types (e.g., voice, video, text, file sharing) real-time communication sessions. To those ends, the present disclosure proposes a communication server that includes an orchestration layer as a platform-as-a-service (PaaS). The embodiments described in more detail below allow the merchant/developer to provide the separate types (e.g., voice, video, text, file sharing) of real-time communication sessions through a unified interface. In other words, the communication server includes a unified interface that allows the provision of various types of real-time communication sessions.

Generally, various telecommunication functions are typically performed by separate and specialized applications running on one or more hardware/servers. The presently proposed communication server interacts with the one or more hardware/servers to select these separate and specialized applications, and interconnects the various telecommunication functions to provide real-time telecommunication services. For example, the communication server identifies a type of the real-time telecommunication service requested, and then interacts with the one or more hardware/servers to select separate and specialized applications whose functions match with the requested real-time telecommunication service. In other words, based on the type of the real-time telecommunication service requested, the communication server selects separate and specialized applications, and interconnects their various telecommunication functions to provide the requested real-time telecommunication service. As discussed below in further detail, the communication server may utilize different criteria, than the type of the real-time telecommunication service requested, to select the separate and specialized applications.

The presently proposed communication server enables enrichment of services with real-time contextual communications, providing a more engaging user experience and fostering collaboration. Other advantages of the unified interface of the communication server include planned automation of tasks in a virtual computing environment (e.g., the cloud).

Figure 1:
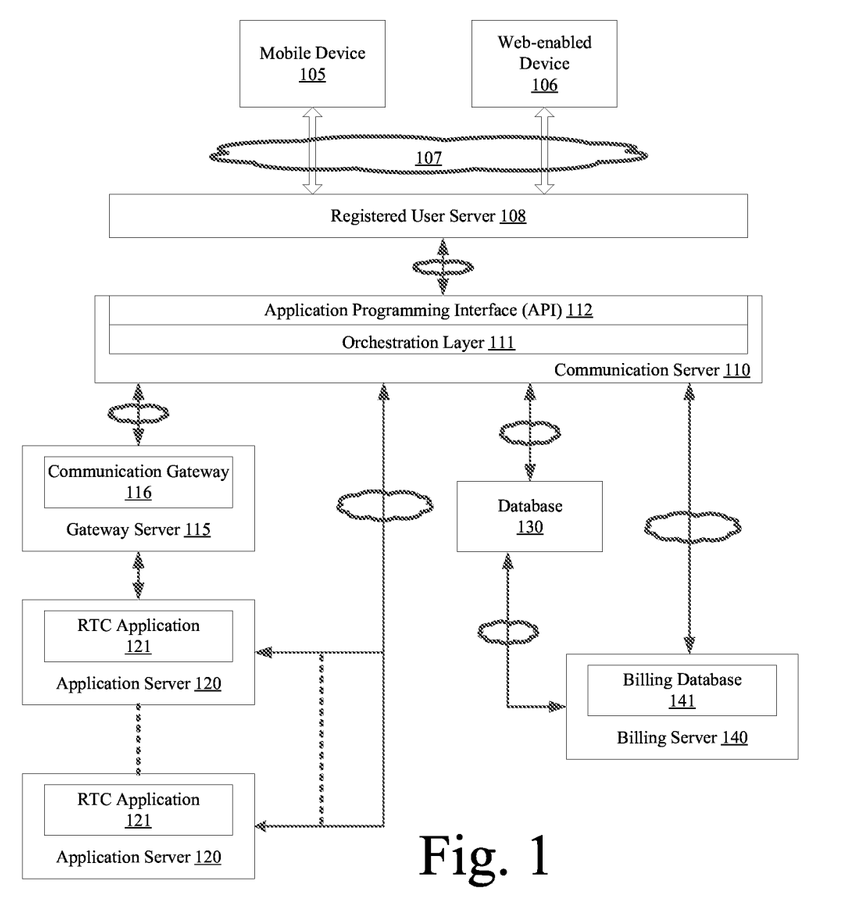
FIG. 1 illustrates an example network architecture in which exemplary embodiments may be incorporated.

FIG. 1 illustrates a block diagram of the system architecture 100 in which the embodiments of the present disclosure may be incorporated. The system architecture 100 includes a user's web-enabled mobile device 105 and a user's web-enabled device 106, both of which may access a merchant's website running on the merchant server 108 (registered user server 108) via the Internet network 107. In turn, the merchant server 108 may interface with an orchestration layer 111 included in the communication server 110 via the Internet network 107. In various embodiments, the merchant server 108 may interface with the communication server 110 through a custom application programming interface (API) 112 included in an orchestration layer 111 of the communication server 110. The communication server 110 may interface with a communication gateway 116 included in a gateway server 115, a plurality of real-time communication (RTC) applications 121 running on one or more application servers 120, a system database 130, and a billing server 140 including a billing database 141. In various embodiments, the communication server 110 may interface with the billing server 140 directly or through the system database 130.

The merchant server 108, the communication server 110, the gateway server 115, the one or more application servers 120, and the system database 130 may be included within a single server or separate servers. Further, the various servers 110, 108, 115, 120 of FIG. 1 are shown as single boxes for ease of illustration. However, the concept of a server in FIG. 1 may include more than one server, so for instance, the communication server 110 may represent a single server computer or multiple server computers working together. The same is true for the merchant sever 108, the communication server 110, the gateway server 115, and the one or more application servers 120—a single box can represent one or more servers. Various embodiments may include any appropriate hardware to act as a server, such as a general purpose computer running an operating system such as Linux. The user devices 105, 106 may be any appropriate type of devices, such as laptop computers, desktop computers, smartphones, tablets, and the like. Although network 107 is shown as the Internet, it is understood that various embodiments may communicate across any appropriate network. For example, the user devices 105, 106 may interface with the communication server 110 through a Local Area Network (LAN), Wide Area Network (WAN), cellular network, or any other network.

The communication server 110 manages, monitors, and maintains various applications and services. The communication server 110 includes the application programming interface (API) 112 to receive commands and messages from the merchant server 108, and relays the received commands and messages to the appropriate application servers for processing. The communication server 110 conveniently provides a unified interface to the merchants/developers for using different services provided by the communication gateway 116, the RTC applications 121, the database 130, and the billing server 140. The merchants/developers are then able to leverage the unified interface of the communication server 110 to provide different types (e.g., video, voice, text, file sharing) of real-time communications to their clients. As such, the communication server 110 provides unified access to the applications and services provided by the communication gateway 116, the RTC application servers 120, the database 130, and the billing server 140 for the convenience of the merchant/developer.

The present disclosure allows a merchant/developer to interface with the orchestration layer 111 upon registration with the communication server 110. In various embodiments, a merchant/developer may register with the communication server 110 by using a web portal to access the registration webpage of the communication server 110. The orchestration layer 111 enables storing of registration information of the merchant/developer in a domain in the database 130. Registration information may also be stored in separate domains in the gateway server 115 and/or the one or more application servers 120. Registration information of the merchant/developer may include information of the user such as name, telephone number, IP address, email, device information, billing account number, credit card number, and the like.

Upon registration, the merchant/developer is provided with credentials to use when accessing the services provided by the communication gateway 116, the applications running on the one or more application servers 120, the database 130, and the billing server 140. The merchant/developer may access the above services upon receiving a request from one of its clients to, for example, conduct a real-time communication session.

In other words, the merchant may register as a user of the communication server 110, and allow its clients or customers to conduct real-time communication sessions with, for example, merchant representatives. As discussed previously, the merchant may provide a URL link on the merchant's website being used by a client. The user application may describe that, by clicking on the URL link, the client may conduct a real-time communication session with a merchant representative at a call center. The client may click on the link and maybe able to access the services associated with the communication server 110 through the registered account of the merchant. In one embodiment, the client may click on the link and maybe able to conduct a real-time communication session with the merchant representative for the purpose of receiving customer service from the merchant. In this case, even though the client is the calling party and the merchant is the destination party, the communication server 110 bills or charges the account of the merchant who is the registered user. In other words, the merchant pays for the above communication session between the client and the merchant representative as part of providing customer service to its clients.

Upon successful registration, the merchant may be provided with credentials to access the services associated with the communication server. These credentials may include, for example, a username and a password to be entered by the merchant to access the services provided by the system. The credentials may also include a number of credits purchased by the merchant to access the services. The credentials provided to the merchant may be associated with the merchant's registration information stored in the database 130.

The merchant may provide the credentials to authenticate itself and to access the communication server 110. Alternatively, the communication server 110 may coordinate with the communication gateway 116 to determine an identity of the merchant based on an IP address included in a message (discussed below) to access the communication server 110. In various embodiments, the communication server 110 may coordinate with the communication gateway 116 and the database 130 to compare the IP address in the message with the registration information of registered merchants stored in the database 130. The communication server 110 may authenticate the merchant as a registered user with sufficient credits to conduct the communication session upon finding a match for the IP address, etc. in the database 130. Of course, the communication server 110 may use any information other than the IP address for authentication purposes. Upon successful authentication, the communication server 110 may coordinate with the communication gateway 116, the one or more application servers 120, the database 130, and the billing server 140 to allow the client to conduct the real-time communication session with the merchant's representative.

Upon successful authentication, the communication server 110 may coordinate with the communication gateway 116 to allow the authenticated merchant to access the applications and services associated with the communication server 110. For example, when the merchant server 108 receives a request from a client device 105, 106 to conduct a communication session with the merchant's representative (destination party), the merchant server 108 may access the communication server 110 and send a message including the received request for the real-time communication session. The message may include details (e.g., IP address, phone number, etc.) associated with the client device 105, 106. Further, the message may include additional information such as the type (e.g., video, voice, text, file sharing) of real-time communication session that the communication server 110 must provide and support to the client on the merchant's behalf. For example, when the merchant's representative is available through a regular public switched telephone network (PSTN), the merchant may request the communication server 110 to provide the client and the merchant representative with a voice real-time communication session. Alternatively, when a display and a connection to the Internet are provided to the merchant's representative, the merchant may request the communication server 110 to provide the client and the merchant representative with an audio-video real-time communication session, a text messaging real-time communication session, a file-sharing real-time communication session, or any combination of these real-time communication sessions.

In various embodiments, as shown in FIG. 1, the communication server 110 may interface with the merchant server 108 through the application programming interface 112. That is, the merchant server 108 may call functions of the application programming interface 112 to inform the communication server 110 that a client of the merchant wishes to conduct a communication session with a destination party. In various embodiments, the merchant server 108 may identify the destination party based on, for example, information included in the client's request, and may issue an HTTP/HTTPS request to communicate with the destination party. The application program interface 112 may receive the HTTP/HTTPS request from the merchant server 108 via the network 107 (e.g., Internet). The application program interface 112 may be configured to accept the HTTP/HTTPS request in several different formats, such as XML, JSON, and URL-Encoded (GET/POST).

The communication server 110 may pass the destination information along to the communication gateway 116, which may determine whether the merchant's representative (destination party) is available to conduct the requested real-time communication session. When it is determined that the merchant's representative is available, the communication server 110, the communication gateway 116, and the one or more RTC application servers 120 may coordinate to set up the communication session. For example, the communication server 110 and/or the communication gateway 116, may send a notification to the merchant's representative. The notification may inform the merchant's representative that the client wishes to conduct a real-time communication session with the merchant's representative. If the merchant's representative accepts the request for real-time communication session, then the communication server 110 may provide the necessary signaling (e.g., SIP) for the applications running on the one or more RTC application servers 120 to set up the communication session. In this way, the communication server 110, the communication gateway 116, and the one or more RTC application servers 120 may coordinate with each other to conduct a real-time communication session between the client device 105, 106 and the merchant's representative.

The communication server 110 may further coordinate with the billing server 140 to determine and bill the charges incurred for the above real-time communication session to the merchant's account. In various embodiments, the communication server 110 may enable the monitoring of duration of the communication session, and coordinate with the billing server 140 to bill/charge the authenticated merchant for the communication session. The coordination with the billing server 140 may include deducting a number of credits required for the above communication session from the number of credits previously purchased by the authenticated merchant.

The communication server 110 may also allow the client to conduct communication sessions with the merchant's representative over a plurality of different networks. For example, when it is determined that the merchant's representative is available through the PSTN network, the communication server 110 and the communication gateway 116 may coordinate with one or more RTC application servers 120 to set up a public switched telephone network (PSTN) phone call to the merchant's representative. That is, the communication server 110 may enable setting up of an IP to PSTN call between the client and the merchant's representative. This IP to PSTN call may include a portion of the call being conducted over the Internet protocol and another portion over the PSTN network.

In various embodiments, the communication server 110 may request the one or more RTC application servers 120 to set up the IP to PSTN call by providing information (e.g., IP address) of the client and destination information (e.g., telephone number) of the merchant's representative. The one or more RTC application servers 120 may use address translation to translate the IP address of the client into a telephone number. The one or more RTC application servers 120 may then use the translated telephone number to place the call the merchant's representative over the PSTN network. For example, to place the call, the one or more RTC application servers 120 may provide the translated telephone number of the client and the telephone number of the merchant's representative to a PSTN provider. Upon acceptance of the call by the destination party, the IP to PSTN call is set up and the client and the merchant's representative may communicate.

During the communication, data may be received by the communication server 110 in the form of digital IP packets from the client device 105, 106 over the IP network. In this case, the one or more RTC application servers 120 may receive and process the digital IP packets into a digital signal, and then convert the digital signal into an analog signal to be sent to the PSTN provider for communication over the PSTN network. Also, data may be received by the one or more RTC application servers 120 (through the PSTN provider) in the form of an analog voice signal from the merchant's representative over the PSTN network. In this case, the one or more RTC application servers 120 may convert the analog voice signal into a digital voice signal, and then use a codec to process the distal voice signal to produce digital IP packets to be sent to the client device 105, 106 over the IP network.

In this way, the communication server 110, the communication gateway 116, and the one or more RTC application servers 120 may coordinate the processing and the signaling required for conducting the above IP to PSTN call. As such, communication server 110, the communication gateway 116, and the one or more RTC application servers 120 together act as a bridge between the web-based source party to call the telephone number of the destination party over the PSTN network. The communication server 110 may further coordinate with the billing server 140 to determine and bill the charges incurred for the IP to PSTN call to the merchant's account. To conduct the above communication sessions, the servers 110, 116, 120 may use one or more signaling protocols, such as SIP or other protocol. Once the communication session has been set up, audio and video communication may be enabled as discussed above by using, for example, Real-time Transport Protocol (RTP) or other protocol. File sharing may be performed using, for example, File Transport Protocol (FTP) or other protocol.

The one or more RTC application servers 120 simplify and enrich the user experience by providing real-time multimedia applications for communication. With the help of RTC multimedia applications running on the one or more RTC application servers 120, information may be exchanged instantly or with negligible latency. During communication enabled by the RTC applications, the data is communicated between the source and the destination in real time. Now, specific telecommunication functions for the different types (e.g., video, voice, text, file sharing) real-time communication sessions may typically be performed by separate and specialized RTC applications. The communication server 110 interacts with the one or more RTC application servers 120 to selectively provide any combination of the separate and specialized RTC applications (running on the one or more RTC application servers 120) required to support the different types (e.g., video, voice, text, file sharing) real-time communication sessions. That is, the communication server 110 enables and interconnects the functions performed by the separate RTC applications to support the real-time telecommunication sessions.

The communication server may select one or more RTC applications, which may execute together to integrate voice, video, instant messaging, presence, mobility, conferencing and collaboration over any network and any device, including: mobile and tablet devices, WebRTC-based web clients, PCs, Macs, smartphones, multimedia terminal adapters (MTAs), analog telephony adapters (ATAs), optical network terminals (ONT), and televisions. In this way, the communication server 110 enables selective use of a number of RTC applications from among the plurality of RTC applications running on the one or more RTC application servers 120 to support the real-time communication sessions. The number of RTC applications selected by the communication server may range anywhere from one RTC application to all of the plurality of the RTC applications running on the one or more RTC application servers 120.

As discussed previously, specific telecommunication functions for the different types (e.g., video, voice, text, file sharing) real-time communication sessions may typically be performed by separate and specialized RTC applications. The communication server 110 may select a number of the separate and specialized RTC applications to support a real-time communication session. In the below discussed examples, even though the functions for the communication sessions may be discussed as being performed by separate RTC applications, a single RTC application may perform those functions. In other words, any number of RTC applications may be selected by the communication server 110 to support the different types of real-time communication sessions.

For example, as previously discussed, a merchant's client and the merchant representative may conduct an IP to PSTN real-time communication session. During the communication, the client's device 105, 106 may send data to the communication server 110 in the form of digital IP packets over the IP network. In response, the communication server 110 may select a first RTC application to process the digital IP packets into a digital signal, and then convert the digital signal into an analog signal. Further, the communication server may select a second RTC application to send the analog signal to a PSTN provider for communication over the PSTN network. Also, the device used by the merchant's representative may send audio data (through the PSTN provider) in the form of an analog voice signal over the PSTN network. The communication server 110 may select a third RTC application to convert the received analog signal into a digital voice signal, and to use a codec to process the digital voice signal to produce digital IP packets. Finally, the communication server 110 may select a fourth RTC application to transmit the digital packets to the client device 105, 106 over the IP network. In this way, the communication server 110 may select a number of RTC applications to support the processing and signaling required for the above IP to PSTN communication session.

In various embodiments, the communication server 110 may pre-select (e.g., prior to starting the real-time communication session) an RTC application that enables recording of a voice message from the client device 105, 106. In this case, if it is later determined that the merchant's representative is offline or unavailable for the requested real-time communication session, the pre-selected RTC application may enable the client to leave a text-based message or a voice message for the merchant's representative. Alternatively, the communication server 110 may select the RTC application that enables recording of a text-based message or a voice message after it is determined that the merchant's representative is unavailable for the requested real-time communication session. For example, when a request for a real-time communication session is received and it is determined that the merchant's representative is unavailable, the communication server 110 may select the RTC application that may record the digital signals received from the client device 105, 106 as audio signals in the form of a voicemail message. In either case, the RTC application may attach the client's data a timestamp to the recorded voicemail. Finally, the RTC application may allow voice to text transcription by converting the data in the audio signals into text form, and making the text available to the merchant's representative. As such, the communication server 110 may select any number of RTC applications prior to starting or during the real-time communication session. In various embodiments, the communication server 110 may select additional RTC applications to support the real-time communication session. In other words, the communication server 110 may dynamically increase (or decrease) the selected number of RTC applications for conducting the real-time communication session.

When the merchant's representative is available for a web-based communication session, the communication server 110 may select RTC applications to enable the client and the merchant representative to co-browse content on the merchant's website. For example, the communication server 110 may select RTC applications that enable transmission and reception of digital IP packets between the client and the merchant's representative. Further, the communication server 110 may select an RTC application that enables synchronization of the displays available to the client and to the merchant's representative. In various embodiments, the selected RTC application may receive uniform resource location (URL) data regarding the content being displayed on the client device 105, 106, and may send synchronization signals such that the same content is acquired from the web and is concurrently displayed on the merchant representative's device.

In various embodiments, selected RTC applications may enable screen sharing between the client and the merchant's representative, such that the content displayed on the client device 105, 106 is shared on the screen visible to the merchant's representative. In the screen sharing scenario, and the RTC applications may also allow the merchant's representative to remotely control the display on the client device 105, 106. For instance, an RTC application may capture mouse and keyboard inputs from the merchant representative, and may send the captured inputs as digital signals to the communication server 110 through the IP network. In turn, another RTC application may send the digital signals to the client device 105, 106 over the IP network for implementation.

In similar ways as discussed above, the communication server 110 may select RTC applications to support features such as voice conferencing, call reject with reason, call forwarding, rich messaging, session data, group messaging, white-boarding, document sharing, etc.

In various embodiments, the communication server 110 may select any number of RTC applications based on information included in the message received from the merchant server 108. As discussed above, the communication server 110 may select a number of RTC applications based on the type (e.g., voice, video, text, file sharing) of requested real-time communication session by the merchant server 108. The communication server 110 may also select a number of RTC applications based on the type of network through which the merchant's representative is available, as indicated in the message from the merchant server 108. For example, as discussed above, the communication server 110 may select applications based on whether the merchant's representative is available through the PSTN network or to a web-based network. In various embodiments, the message from the merchant server 108 may include information about selecting specific RTC applications to be used during the real-time communication session. For example, the merchant may wish to limit the cost associated with certain real-time communication sessions, and may instruct the communication server to select specific or a limited number of RTC applications to be used during the real-time communication session for that purpose. In various embodiments, the communication server 110 may select any number of RTC applications based on a number of RTC applications selected during a previously conducted real-time communication session between a client and a merchant's representative.

The billing server 140 may provide billing solutions for the utilized applications and services. The communication server 110 may monitor the conducted real-time communication sessions, and may coordinate with the billing server 140 to charge the authenticated users (e.g., merchants) for the conduct a real-time communication sessions through their registered accounts.

Figure 2:
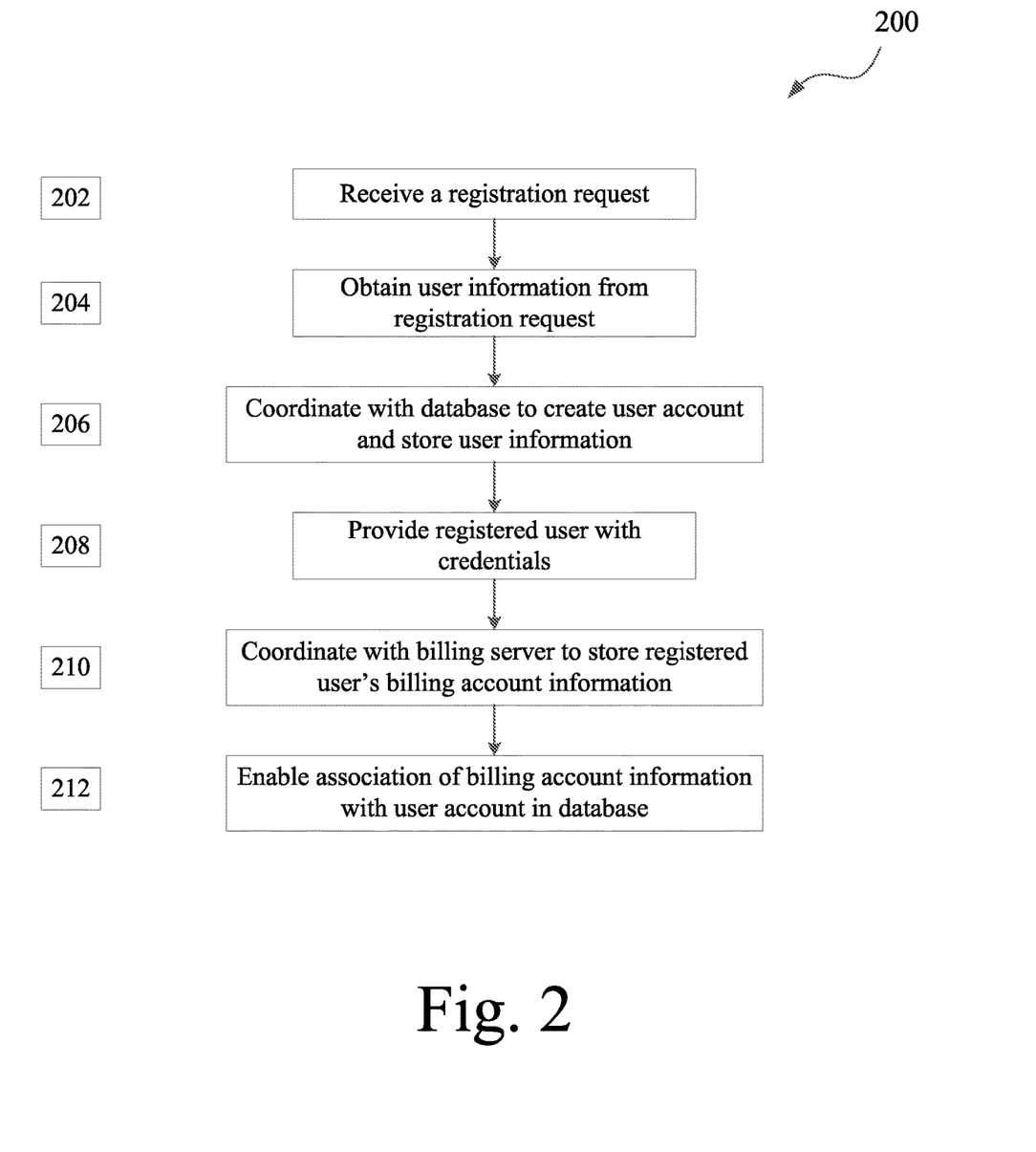
FIG. 2 is a flowchart illustrating a method 200 for registering a user of the communication server.

FIG. 2 is a flowchart illustrating a method 200 for registering a user of the communication server 110. At step 202, the communication server may receive an HTTP registration request over the IP network 107. The registration request may be sent by a merchant that wishes to set up an account to access the applications and services integrated by the communication server 110. The communication server 110 may receive the registration request from the merchant server 108 through the custom application program interface 112. The registration request may include user information such as name, telephone number, IP address, email, device information, billing account number and/or credit card number, and the like.

In response to receiving the registration request, the communication server 110 may perform the following steps. At step 204, the communication server 110 may process the registration request to obtain the merchant's information.

At step 206, the communication server 110 may coordinate with the database 130 to create an account for the merchant, and to store and associate the obtained merchant information in the account created for the merchant.

At step 208, upon creation of the account and the storing of the obtained merchant information, the communication server 110 may provide the merchant with credentials including a username and password, which may be used by the user to access the applications and services integrated by the communication server 110.

At step 210, the communication server 110 may coordinate with the billing server 140 to store the user's billing account information including a billing account number and/or credit card number, and the like in the billing database 141.

At step 212, the communication server 110 may enable the association of the billing account information of the merchant in the billing database 141 with the merchant account in the database 130. This allows the communication server 110 to appropriately bill the billing account of the merchant for any services (e.g., RTC communication sessions) utilized by the merchant. In this way, the communication server 110 allows a merchant to become a registered user.

Figure 3:
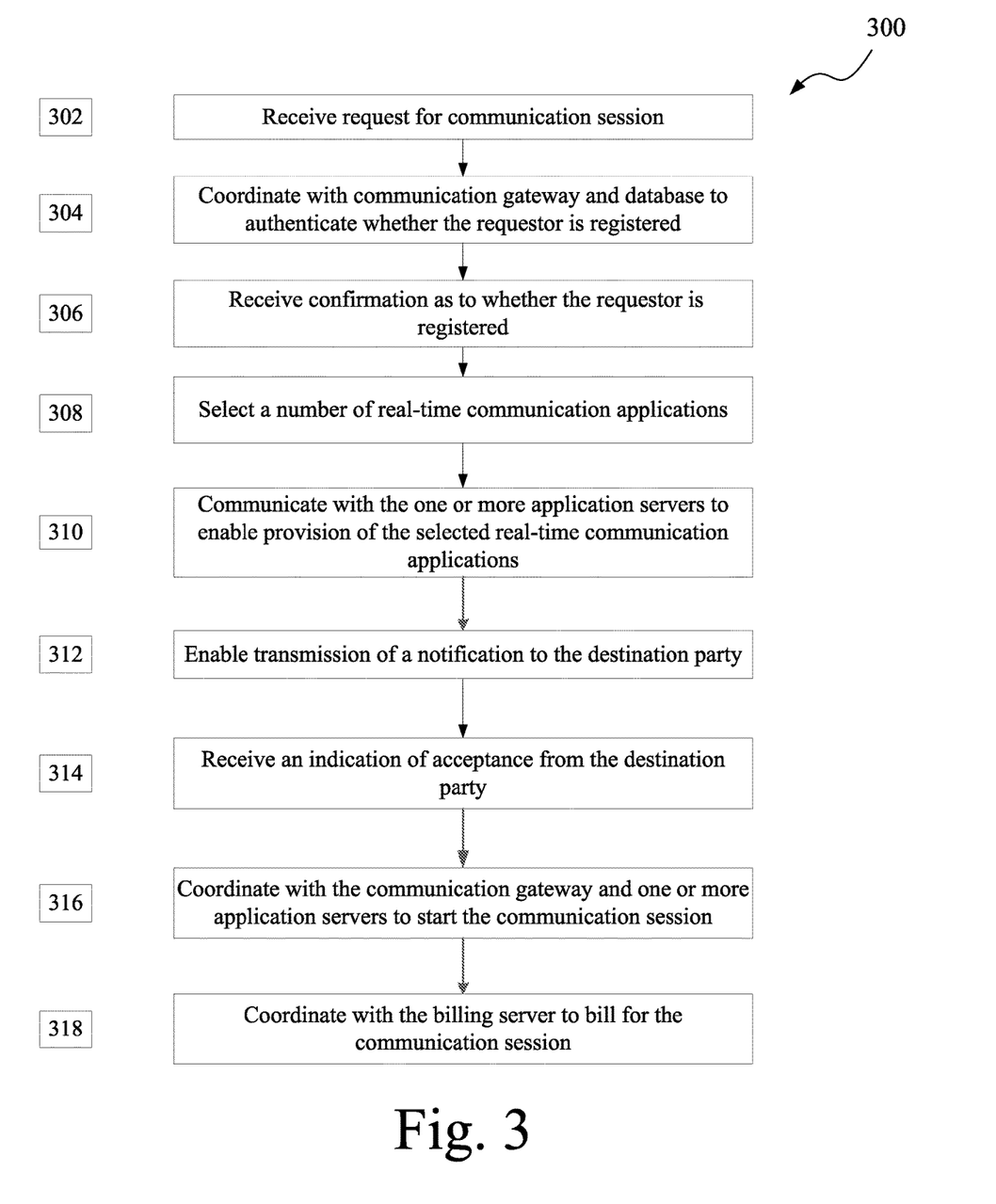
FIG. 3 is a flowchart illustrating a method 300 for a registered user accessing services through the communication server.

FIG. 3 is a flowchart illustrating a method 300 for a registered user accessing services integrated by the communication server 110. In various embodiments, a registered user wishes to conduct the communication session. The communication session may be a real-time communication session including any type of communication such as voice communication, video communication, text communication, data/file-sharing communication, etc.

At step 302, the communication server 110 may receive an HTTP request for a communication session from the merchant server 108 over network 107. The HTTP request may include information regarding source information and destination information of participants of the communication session. For example, the source information may include contact information of the source party (e.g., merchant's client) such as source name, phone number, IP address, etc. The destination information may include contact information of the destination party (e.g., merchant's representative) such as the destination's name, phone number, IP address, etc. In addition, the HTTP request may include the merchant's credentials such as the username and password provided to the merchant during registration, merchant server IP address, etc. This enables the communication server 110 to authenticate the HTTP request, and understand that the merchant's registered account is to be billed for the requested real-time communication session. Finally, the HTTP request may include information based on which the communication server 110 may select a number of RTC applications to support the requested real-time communication session. For example, the HTTP request may include information regarding the type (e.g., voice, audio-video, text, file sharing, etc.) of real-time communication session requested.

At step 304, the communication server 110 may coordinate with the database 130 to enable the communication gateway 116 to authenticate the HTTP request as being received from a registered user. For instance, the communication server 110 may route the HTTP request along with the received information to the communication gateway 116. Further, the communication server 110 may use the merchant's credentials included in the HTTP request to query the database 130 to provide any registered user information corresponding to the credentials. The communication server 110 may pass any registered user information received from the database 130 to the communication gateway 116. The communication gateway 116 may compare the merchant's credentials received in the HTTP request with the registered user information received from the database 130 to determine whether the merchant is a registered user of the communication server 110.

At step 306, the communication server 110 may receive confirmation from the communication gateway 116 as to whether the merchant is a registered user of the communication server 110. If the merchant is not a registered user of the communication server 110, then the communication server 110 sends an HTTP message to the merchant server 108 denying the merchant's request for the real-time communication session. This HTTP message may include information enabling the merchant to become a registered user of the communication server 110. If the merchant is a registered user of the communication server 110, then the method moves to step 308.

At step 308, the communication server 110 may select, based on the information included in the HTTP request, a number of RTC applications required to support the requested real-time communication session. For example, based on the type of real-time communication session indicated by the merchant server 108 in the HTTP request, the communication server 110 may select a number of RTC applications to perform the various functions required to support the requested type of real-time communication session. In other words, the communication server identifies a type of the real-time telecommunication service requested, and then interacts with the one or more hardware/servers to select RTC applications whose functions match with the requested real-time telecommunication service. As discussed below in further detail, the communication server may utilize different criteria, than the type of the real-time telecommunication service requested, to select the separate and specialized applications. Also, as discussed previously, the communication server 110 may select any number of RTC applications prior to starting or during the real-time communication session.

At step 310, the communication server 110 may communicate with the one or more application servers 120 that include the selected RTC applications to enable provision of the selected RTC applications to support the requested real-time communication session.

At step 312, the communication server 110 may enable transmission of a notification to the destination party. The notification informs the destination party that the caller wishes to conduct a real-time communication session with the destination party. The notification may also identify the source party and the type of communication session (e.g., voice communication, video communication, text communication, data/file-sharing communication, etc.) desired. The notification may allow the destination party the option of accepting or declining the communication session. In various embodiments, the above notification is enabled only when it is determined, in step 306, that the merchant is a registered user of the communication server 110.

At step 314, the communication server 110 receives an indication from the destination party as to whether the destination party has accepted or declined the source party's requested real-time communication session. If the destination party is unavailable or has declined the requested real-time communication session, then the communication server 110 may pass an HTTP message to the merchant server 108 to inform the merchant of the destination party's declination of the requested real-time communication session. On the other hand, if the destination party has accepted the caller's communication session, then the 110 may enable the processing and signaling required for the requested real-time communication session to be started between the source party and the destination party.

At step 316, the communication server 110 may coordinate with the one or more RTC application servers 120 to execute the selected RTC applications and start the real-time communication session between the source party and the destination party. In various embodiments, the communication server 110 may conduct the signaling required to establish live connectivity between the client device 105, 106 and the communication gateway 116. Under the direction of the communication server 110, the communication gateway 116 may coordinate with the one or more RTC application servers 120 to setup and start the real-time communication session. In this way, the communication server 110, the communication gateway 116, and the one or more RTC application servers 120 allow real-time communication session between the source party and the destination party. When the communication session is an IP to PSTN communication session, then the communication session may be conducted over a combination of the IP network and the PSTN network, as discussed above.

Upon starting of the communication session between the party and the destination party, at step 318, the orchestration layer 111 may coordinate with the billing server 140 to bill/charge the merchant for the above real-time communication session. In various embodiments, the communication server 110 may enable the monitoring of a duration of the communication session between the first device and the second device, and coordinate with the billing server 140 to bill/charge the merchant for the communication session. The coordination with the billing server 140 may include deducting a number of credits required for the above real-time communication session from the number of credits previously purchased by the merchant. Other ways of billing/charging the caller for the above communication session are also possible.

In this case, even though the client is the source party and the merchant's representative is the destination party, the communication server 110 bills or charges the account of the merchant who is the registered user. In other words, the merchant pays for the above real-time communication session between the client and the merchant's representative as part of providing customer service to its clients.

Figure 4:
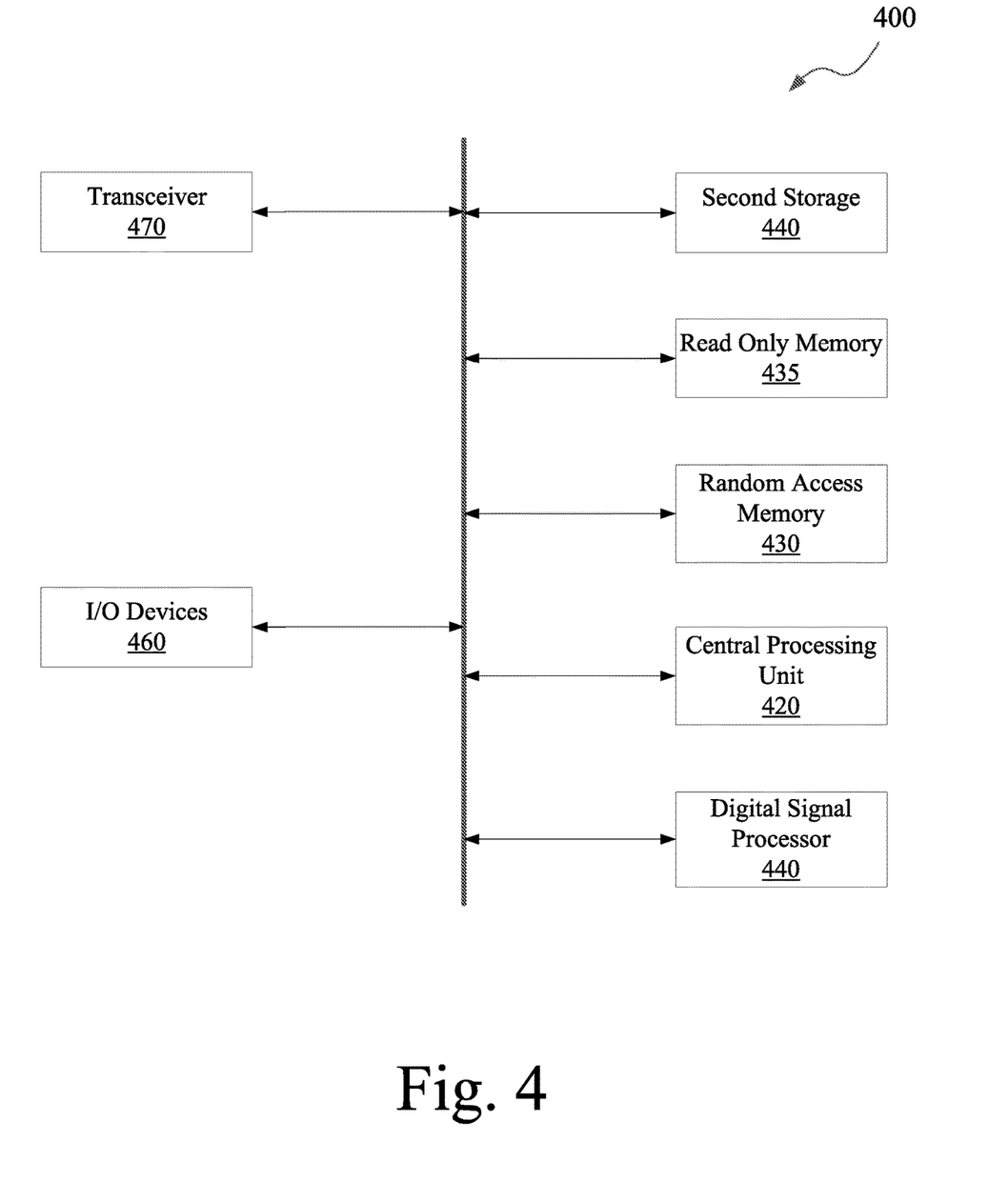
FIG. 4 illustrates an example computer system 400 adapted according to one embodiment of the present disclosure.

FIG. 4 illustrates an example computer system 400 adapted according to one embodiment of the present disclosure. The computer system 400 includes an example system on which embodiments of the present disclosure may be implemented (such as servers 108, 110, 115, 120, 140). The computer system 400 includes a digital signal processor (DSP) 410, a central processing unit (CPU), a random access memory (RAM) 430, a read-only memory (ROM) 435, secondary storage 440, encryption and decryption resources 450, input/output (I/O) devices 460, and a of transceivers 470, all of which may be communicatively coupled via a bus 402.

The CPU 420 may be implemented using hardware or a combination of hardware and software. Although illustrated as a single CPU, the CPU 420 is not so limited and may comprise multiple processors. The CPU 420 may be implemented as one or more processors, i.e., as one or more chips, cores (e.g., a multi-core processor), field-programmable gate arrays (FPGAs), and/or application specific integrated circuits (ASICs). Likewise, the DSP 410 may be implemented as more than one DSP chip. The DSP 410 may perform transcoding or transrating of a media stream or call flow received by a transceiver 470. Crypto resources (not shown) may include a hardware accelerator for performing security features such as encryption or authentication of a media stream or call flow received by transceiver 470.

The secondary storage 440 may comprise one or more disk drives or solid state drives and is used for non-volatile storage of data and as an over-flow data storage device if the RAM 430 is not large enough to hold all working data. The RAM 430 may be static RAM, dynamic RAM, or the like, and the ROM 435 may be programmable ROM (PROM), erasable PROM (EPROM), electrically EPROM (EEPROM), or the like. The secondary storage 440 may be used to store programs that are loaded into the RAM 430 when such programs are selected for execution. The ROM 435 is used to store instructions and perhaps data that are read during program execution. The ROM 435 is a non-volatile memory device that typically has a small memory capacity relative to the larger memory capacity of the secondary storage. The RAM 430 is used to store volatile data and perhaps to store instructions. Access to both the ROM 435 and the RAM 430 is typically faster than to the secondary storage 440.

The computer system 400 includes transceivers 470. There may be a transceiver 470 for each communication line (e.g., electrical or optical) coupled to the computer system 470. A transceiver 470 may be bidirectional or unidirectional, depending on the embodiment. Each transceiver 470 is adapted to couple computer system 400 to a communication link (e.g., a wired or wireless communication link). In the examples of FIGS. 1-3, transceivers 470 may couple a respective device to network 120 and/or to network 170.

The I/O devices 460 may include a keyboard, a computer mouse, a microphone, and/or a display device for allowing a user to provide input to and receive output from the computer system 400.

It is understood that by programming and/or loading executable instructions onto the computer system 400, at least one of the CPU 420, the RAM 430, and/or the secondary storage 440 are changed, transforming the computer system 400 in part into a particular machine or apparatus having the functionality taught by the present disclosure. The executable instructions may be stored on the RAM 430 or secondary storage 440 and loaded into the CPU 420 for execution. The device functionality described above with respect to FIGS. 1-3 may be implemented as a software application running on the CPU 420 and using the RAM 430, the ROM 435, and/or secondary storage 440. Specifically, for server 130, its functions described at FIGS. 2 and 3 may be implemented as a software application running on the CPU 420.

Logic may be encoded in a non-transitory computer-readable medium, such as RAM 430 and/or secondary storage 440. Such a medium can take many forms, including but not limited to, non-volatile media and volatile media. In various implementations, non-volatile media includes optical or magnetic disks, such as secondary storage 440, and volatile media includes dynamic memory, such as various types of RAM 430. CPU 420 reads application code from the readable medium and executes the code to provide the described functionality.

It should be noted that the disclosure is not limited to the specific embodiments shown above. For instance, other embodiments may include a communication session of any type, such as messaging, voice, video, file sharing, and the like.

The scope of embodiments is not limited to any particular type of communication. For instance, various embodiments may be applied to voice communication, instant messaging, multimedia video conferences, file sharing, and the like. Further, while the examples below focus on a Session Initiation Protocol (SIP) embodiment, any appropriate communication protocol can be used in various embodiments. Moreover, the examples below assume use of WebRTC as the communication protocol; however, the scope of embodiments can be applied to any communication protocol that allows a user on one network to conduct real-time communications with a user on a different network. For example, a browser or web-enabled application can be extended via media handling plugins, get access to media input/output on the device running the browser and transport it over any type of bearer, as long as the other end of the communication session has a compatible implementation.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method in a communication server associated with a plurality of applications running on one or more application servers, the method comprising:
   receiving, at the communication server, a web-based request for a real-time communication session;
   selecting, at the communication server, a plurality of applications for the real-time communication session, the selecting based on information included in the web-based request, the plurality of applications for the real-time communication session being to support the real-time communication session, the selected plurality of applications for the real-time communication session being from among the plurality of applications running on the one or more application servers;
   communicating with the one or more application servers to enable provision of the selected plurality of applications for the real-time communication session; and
   enabling the real-time communication session.

2. The method of claim 1, wherein the enabling the real-time communication session includes enabling the real-time communication session between a first device and a second device.

3. The method of claim 2, wherein the selecting the plurality of applications for the real-time communication session includes selecting applications capable of supporting real-time communications between the first device and the second device.

4. The method of claim 2, wherein the receiving the web-based request comprises receiving a hypertext transfer protocol (HTTP) message including contact information associated with the first device and contact information associated with the second device.

5. The method of claim 2, wherein the selecting includes selecting the plurality of applications for the real-time communication session prior to starting the real-time communication session or during the real-time communication session.

6. The method of claim 5, wherein the selecting further includes selecting an additional application for the real-time communication session during the real-time communication session.

7. The method of claim 1, wherein the information in the web-based request includes information regarding a type of the requested real-time communication session.

8. The method of claim 1, wherein the selecting includes selecting the plurality of applications for the real-time communication session based on a type of network through which a second device may conduct the real-time communication session.

9. The method of claim 1, wherein the selecting includes selecting the plurality of applications for the real-time communication session based on a number of Real-Time-Communication (RTC) applications selected during a previously conducted real-time communication session.

10. The method of claim 1, wherein the receiving the web-based request includes receiving the web-based request from a registered device of the communication server for the real-time communication session between a first device and a second device, the registered device being separate from the first device and the second device.

11. A system comprising:
a processor; and
a memory comprising machine readable instructions that when executed by the processor, cause the system to:
receive, at a communication server, a web-based request for a real-time communication session;
select, at the communication server, a plurality of applications for the real-time communication session, the selecting based on information included in the web-based request, the plurality of applications for the real-time communication session being to support the real-time communication session, the selected plurality of applications for the real-time communication session being from among the plurality of applications running on the one or more application servers;
communicate with the one or more application servers to enable provision of the selected applications for the real-time communication session; and
enable the real-time communication session.

12. The system of claim 11, wherein to enable the real-time communication session, the system is to enable the real-time communication session between a first device and a second device.

13. The system of claim 12, wherein to select an application, the system is to select an application capable of supporting real-time communications between the first device and the second device.

14. The system of claim 12, wherein the web-based request comprises a hypertext transfer protocol (HTTP) message including contact information associated with the first device and contact information associated with the second device.

15. The system of claim 12, wherein the applications are selected prior to starting the real-time communication session.

16. The system of claim 12, wherein the applications are selected based on a type of network through which the second device may conduct the real-time communication session.

17. The system of claim 11, wherein the information in the web-based request includes information regarding a type of the requested real-time communication session.

18. The system of claim 11, wherein the system is to further select an additional application during the real-time communication session.

19. The system of claim 11, wherein the applications are selected based on a number of RTC (Real-Time-Communication) applications selected during a previously conducted real-time communication session.

20. A computer program product comprising computer readable code on a non-transitory medium, the computer program product comprising:
code to receive, at a communication server, a web-based request for a real-time communication session, the web-based request being created based on user input to select which type of media to be used in the real-time communication session;
code to select, at the communication server, a plurality of applications for the real-time communication session, the selecting based on information included in the web-based request, the plurality of applications for the real-time communication session being to support the real-time communication session, the selected applications being from among a plurality of applications running on the one or more application servers, wherein the plurality of applications running on the one or more application servers include at least a voice application, a text application, and a video application;
code to communicate with the one or more application servers to enable provision of the selected applications for the real-time communication session; and
code to enable the real-time communication session.

* * * * *